Patented July 1, 1941

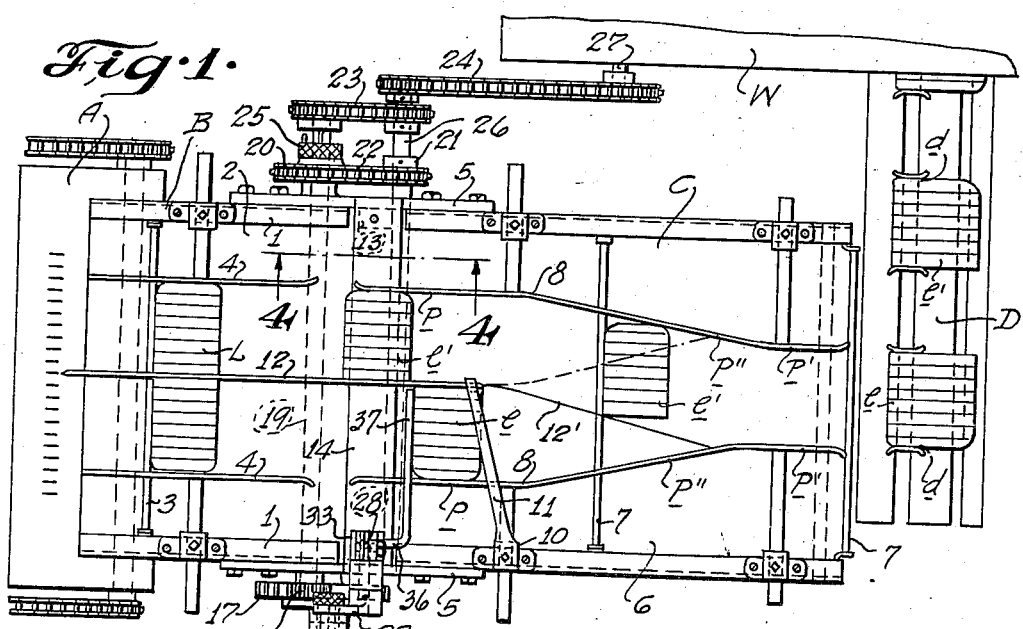

2,247,676

UNITED STATES PATENT OFFICE 2,247,676

SLICED BAKED BREAD LOAF HANDLING MECHANISM

Walter A. Thum, St. Louis, Mo., assignor to Papendick, Inc., St. Louis, Mo., a corporation of Missouri Application April 22, 1940, Serial No. 330,966

5 Claims. (Cl. 146—153)

This invention relates generally to sliced baked bread loaf handling mechanism. More particularly, this invention relates to a certain new and useful improvement in mechanism for sub-dividing sliced baked bread loaves into fractions and has for its chief objects the provision of a uniquely constructed and automatically operable mechanism for fractionating the successive sliced loaves speedily, smoothly, and without injury.

And with the above and other objects in view, my invention resides in the novel features of form, construction, arrangement, and combination of parts presently described and pointed out in the claims.

In the accompanying drawing—

Figure 1 is a plan view of a baked bread loaf fractionating mechanism constructed in accordance with and embodying my present invention;

Figure 2 is a side elevational view of the mechanism;

Figure 3 is a fragmentary transverse sectional view of the mechanism, taken approximately along the line 3—3, Figure 2; and Figure 4 is an enlarged longitudinal sectional view of the mechanism, taken approximately along the line 4—4, Figure 1.

Referring now in more detail and by reference characters to the drawing, which illustrates a preferred embodiment of my present invention, A designates a conventional baked bread loaf slicing machine preferably, though not necessarily, of the vertically reciprocating knife or blade type.

Disposed at the rear or discharge end of the machine A, is a first or discharge conveyor means B, which preferably includes a pair of opposed side rails 1, a horizontally disposed conveyor table 2, a connected series of conventional chain or otherwise driven flight-bars 3, and a pair of opposed parallel side guides 4 also of substantially conventional design for confining the successively sliced loaves.

Suitably fixed upon and projecting rearwardly from the side rails 1, is a pair of opposed parallel connector plates 5 for supporting engagement with the forward end of a table 6 of a second or fractionating transfer conveyor means C substantially of the type and character fully disclosed and described in a copending application, Serial No. 280,397, filed June 21, 1939, by me and Gustav C. Papendick, now deceased, the table 6 being disposed horizontally on the same plane with the table 2 and the conveyor means C comprising preferably a series of suitably spaced flight-bars 7 chain or otherwise connected for movement over the table 6, a pair of opposed loaf-fraction guides 8 presented rearwardly over the table 6 and adjustable transversely of the machine, each of the guides 8 preferably integrally comprising a front portion $p$, a rear portion $p'$, and an oblique intermediate section $p''$, all as best seen in Figure 1 and for purposes presently fully appearing.

Also preferably forming part of the transfer conveyor means C and spanning the table 6, is a bridge 10 equipped with a depending lug 11 for supporting an intermediate guide 12 having a rearwardly extending flexible switch section 12', as best seen in Figure 1 and for purposes presently appearing.

Operatively disposed at the rear or discharge end of the table 6 of the second or transfer conveyor means C, is the intake conveyor D of a wrapping machine W, the conveyor D having a plurality of spaced loaf-fraction receiving pockets $d$ and being preferably driven in predetermined timed relation to the respective series of flight-bars 3 and 7, for purposes presently fully appearing.

Formed preferably integrally with the connection-plates 5, are flange-extensions 13 presented inwardly of the machine for supporting a relatively narrow horizontal dead plate 14 intermediate the first and second conveyor means B and C.

Also preferably integral with, or otherwise fixed intermediate its length upon, one of the connection-plates 5, is a bracket arm 15, suitably fixed upon the lower end-portion of which and extending transversely outwardly of the machine, is a stub-shaft 16 for rotatively supporting a driven gear 17 positioned for meshing engagement with a drive gear 18 keyed upon the projecting end of the drive shaft 19 of the transfer conveyor B.

At its other end, the drive shaft 19 projects outwardly beyond the conveyor side rail 1 and by suitable sprockets 20, 21, chains 22, 23, 24, and an indexing pin clutch 25 is drivingly connected to the drive shaft 26 of the conveyor means C and to the main drive shaft 27 of the wrapping machine W, all as best seen in Figure 1 and as more fully described in the previously mentioned copending application, Ser. No. 280,397.

Journaled in and extending through the upper end-portion of the bracket 15 and disposed horizontally over the conveyor table 2, is a transverse counter-shaft 28 equipped on its outer end with a crank arm 29 provided with an elongated slot 30 for shiftably receiving an outwardly projecting adjustment spindle-screw 31 for permitting variable adjustment of the throw of the crank arm 29.

Journaled at its one end upon the spindle-screw 31 and at its other end upon a stud 17' threadedly mounted in the gear 17, is a link 32 for drivingly oscillating the crank arm 29 and its associated countershaft 28.

Suitably fixed upon the inner end of the counter-shaft 28, is a split-collar 33, projecting radially outwardly from which is a rod-like arm 36 bent inwardly at its lower end in the provision of a pusher-extension 37 disposed parallel with and over and at right angles to the longitudinal axis of the conveyor table 6 and having a length slightly less than the distance or space between the intermediate guide or divider plate 12 and one of the side guides 4, all as best seen in Figure 3 and for purposes presently fully appearing.

In use and operation, the sliced loaves L are progressed rearwardly over the table 2 by the flight-bars 3 of the first conveyor means B between the intermediate guide or divider plate 12 and the side guides 4 and successively deposited upon the horizontally disposed dead plate 14 between the guides 8 in two axially aligned but separated fractions l, l', and it may be here stated that the gear 17 is so shaped and timed with respect to the movement of the flight-bars 3 that, in the interval during which a loaf L is being discharged onto the plate 14 by a particular flight-bar 3, the pusher arm 37 is over and out of the path of travel of the loaf L, as indicated in dot-dash lines in Figure 2.

As the fractions l, l', come to rest on the dead plate 14, the counter-shaft 28 is rotarily actuated by the gear 17 in timed relation with the movement of the flight-bars 3, so that the pusher arm 37 is brought into engagement with a deposited loaf-fraction l, which latter is thereby shifted forwardly off of the dead plate 14 and smoothly and evenly onto the table 6 of the transfer conveyor means C, where such fraction is picked up and progressed rearwardly over the table 6 by a bar 7 in substantially the manner described in said co-pending application, Serial No. 280,397. Subsequently, the remaining fraction l' is shifted rearwardly from the dead plate 14 onto the table 6 of the transfer conveyor means C for progression over the table 6 by the loaf-fraction l' of the next succeeding loaf L.

As the pusher arm 37 completes its fraction-advancing movement, the same is swung backwardly and upwardly out of the path of the next succeeding sliced loaf L, it being, of course, understood that the described loaf sub-dividing or fractionating operations are timed to take place and be completed within the length of time required for the first conveyor bars 3 to advance the next succeeding sliced loaf L for discharge upon the dead plate 14.

The successively deposited loaf-fractions l, l', as they are progressed by the bars 7 over the table 6, are directed by means of the guides 8 into a single series for discharge in succession one behind the other upon the conveyor D for delivery, in turn, to the wrapping machine W.

The mechanism is relatively simple in structure, may be economically operated and maintained, and efficiently, speedily, smoothly, and without injury to even the most freshly baked loaf, sub-divides the several successive sliced loaves into fractions for separate wrapping, and it should be understood that changes and modifications in the form, construction, arrangement, and combination of the several parts of the mechanism may be made and substituted for those herein shown and described without departing from the nature and principle of my invention.

Having thus described my invention, what I claim and desire to secure by Letters Patent is:

1. Sliced bread loaf fractionating mechanism comprising, in combination, first conveyor means, second conveyor means spaced from and disposed in longitudinal alignment with the first conveyor means, dead plate disposed intermediate said conveyor means for successively receiving each sliced loaf from the first conveyor means and supporting the received loaf in stationary position, and means including an oscillatory member operable to engage a fractional portion of such loaf while in such stationary position and transfer such portion from said receiving means to the second conveyor means.

2. Sliced loaf fractionating mechanism including a plate for receiving a sliced loaf, a conveyor, and a rotating arm sized for engaging only a portion of the sliced loaf and means for moving the arm through a portion of the path of the loaf and pushing the engaged portion only from the plate for transportation by the conveyor.

3. A sliced loaf handling mechanism comprising, in combination, primary conveyor means, secondary conveyor means longitudinally aligned with and spaced forwardly from the primary conveyor means, a dead plate disposed therebetween for receiving loaves from the primary conveyor means, an upstanding post mounted between the conveyors, a crank-like member rotatably mounted in the post and having a horizontal arm extending over the dead plate for engaging and transferring a predetermined fractional portion of each loaf from the dead plate to the secondary conveyor means, and driving means operatively connected to the crank-like member for rotating the latter in predetermined timed relation to the movement of the primary conveyor means.

4. A sliced loaf handling mechanism comprising, in combination, primary conveyor means, secondary conveyor means longitudinally aligned with and spaced forwardly from the primary conveyor means and driven in timed relation therewith, a dead plate disposed therebetween for receiving loaves from the primary conveyor means, an upstanding post mounted between the conveyors, a crank-like member rotatably mounted in the post and having a horizontal arm extending over the dead plate for engaging and transferring a predetermined fractional portion of each loaf from the dead plate to the secondary conveyor means, and driving means operatively connected to the crank-like member for rotating the latter in predetermined timed relation to the movement of the primary conveyor means.

5. A sliced loaf handling mechanism comprising, in combination, primary conveyor means, secondary conveyor means longitudinally aligned with and spaced forwardly from the primary conveyor means, a dead plate disposed therebetween for receiving loaves from the primary conveyor means, an upstanding post mounted between the conveyors, pusher means operatively mounted in the post and extending across the dead plate for engaging and transferring a predetermined fractional portion of the loaf from the dead plate to the secondary conveyor means, driving means, and link means operatively connected to the driving means and adjustably connected to the pusher means for driving the pusher means at any one of several selected speeds.

WALTER A. THUM.